United States Patent [19]
Stephens

[11] 3,926,800
[45] Dec. 16, 1975

[54] TEMPERATURE STABILIZED WATER JACKET CHROMATOGRAPHIC COLUMN

[75] Inventor: Donald E. Stephens, Palo Alto, Calif.

[73] Assignee: Beckman Instruments, Inc., Fullerton, Calif.

[22] Filed: Jan. 25, 1974

[21] Appl. No.: 436,437

[52] U.S. Cl.................. 210/31 C; 55/67; 55/197; 55/208; 210/198 C; 210/175
[51] Int. Cl.² ........................................ B01D 15/08
[58] Field of Search ...... 210/31 C, 198 C, 175–177; 55/67, 197, 208, 267, 269

[56] References Cited
UNITED STATES PATENTS

| | | | |
|---|---|---|---|
| 3,490,202 | 1/1970 | Ayeas .................................... | 55/67 |
| 3,683,589 | 8/1972 | Seits et al. ......................... | 55/208 X |

FOREIGN PATENTS OR APPLICATIONS

| | | | |
|---|---|---|---|
| 837,363 | 6/1960 | United Kingdom............. | 210/198 C |

Primary Examiner—John Adee

[57] ABSTRACT

Thermal stability of a water jacketed chromatographic column is increased by providing an annular space of non-circulating water immediately surrounding the chromatographic column. This is accomplished by surrounding the column with a concentric tube, the internal diameter of which exceeds the external diameter of the column. A seal is provided between tube and column at the bottom. This arrangement, installed within a conventional water jacket, provides an annular space of non-circulating water. It effectively increases the thermal capacity of the chromatographic column which serves to damp out short cyclic fluctuations in temperature while permitting sufficient heat transfer between the column and the circulating water to effect closely controlled temperature under long-term load changes.

8 Claims, 3 Drawing Figures

TEMPERATURE STABILIZED WATER JACKET CHROMATOGRAPHIC COLUMN

BACKGROUND OF THE INVENTION

The liquid chromatographic process involved in most column chromatography requires that the chromatographic column be kept at a constant temperature. In addition, the flow rate through the column must also be constant. Generally, a water jacket is provided around the chromatographic column with thermostatically temperature-regulated water flowing through the jacket. The rate of eluent flow through the column is controlled by metering the liquid flowing into the column by means of an adjustable displacement pump. Nevertheless, time related variations in the internal volume of the instrument downstream of the metering pump would cause variations in column effluent flow even though the pump delivered liquid at an unvarying rate into the column.

A typical example may be cited in the case of an ion exchange chromatographic amino acid analyzer. The sensitivity of an analyzer may be increased by a factor of 10 by reducing the internal "chromatographic volume" of the analyzer by a factor of ten and increasing the sensitivity of the analyzer's detection system to permit it to detect and measure the reduced volumes of sample throughput. In the case of an amino acid analyzer, detection is effected by combining the column effluent stream with a reagent that is metered into the stream at a constant rate. The blended stream is then passed through a heated volume in which amino acids combined with the reagent produce a colored compound. The color density of this compound, which is indicative of the amount of amino acid present, is measured at a specific wavelength by a colorimeter. Temperature variations of the column cause changes in the internal volume of the column which in turn causes changes in flow rate at the column effluent. These changes result directly in variations of the proportions of the blended stream which are analyzed by the colorimeter. These variations are evident as flow related "noise" superimposed on the analytical output signal.

It is accordingly an object of the invention to minimize short term temperature related fluctuations in liquid flow from the column and to improve the quality of the analytic signals, particularly in highly sensitive chromatographic column analytical systems.

Other and further objects, features and advantages of the invention will become apparent as the description proceeds.

SUMMARY OF THE INVENTION

In carrying out the invention in accordance with a preferred form thereof, a sample separating column in a circulating water jacket is provided with a surrounding tube within the jacket, spaced from the column and sealed to it at the lower end to provide an annular body of water around the column. This annulus of water is in thermal contact with the circulating water in the jacket. It increases the effective thermal capacity of the column and minimizes short term fluctuations in temperature and volume of the column. In conventional column type liquid chromatographic analyzers, there is a buffer reservoir, a metering pump for delivering buffered solution to the column, and a sample injection means for introducing the sample onto the column. For amino acid analysis, a reagent reservoir with a metering pump and a mixing tee is provided to mix the reagent and the column effluent, delivering the mixture to a coil in a heated reaction bath to develop the colored compounds. A colorimeter, preferably with a chart recorder connected to it, is provided to analyze the solution from the coil in the reaction bath.

A better understanding of the invention will be afforded by the following detailed description considered in conjunction with the accompanying drawings. The drawings comprise three figures in which like reference characters designate like parts.

DRAWINGS

DETAILED DESCRIPTION

Figure 1:
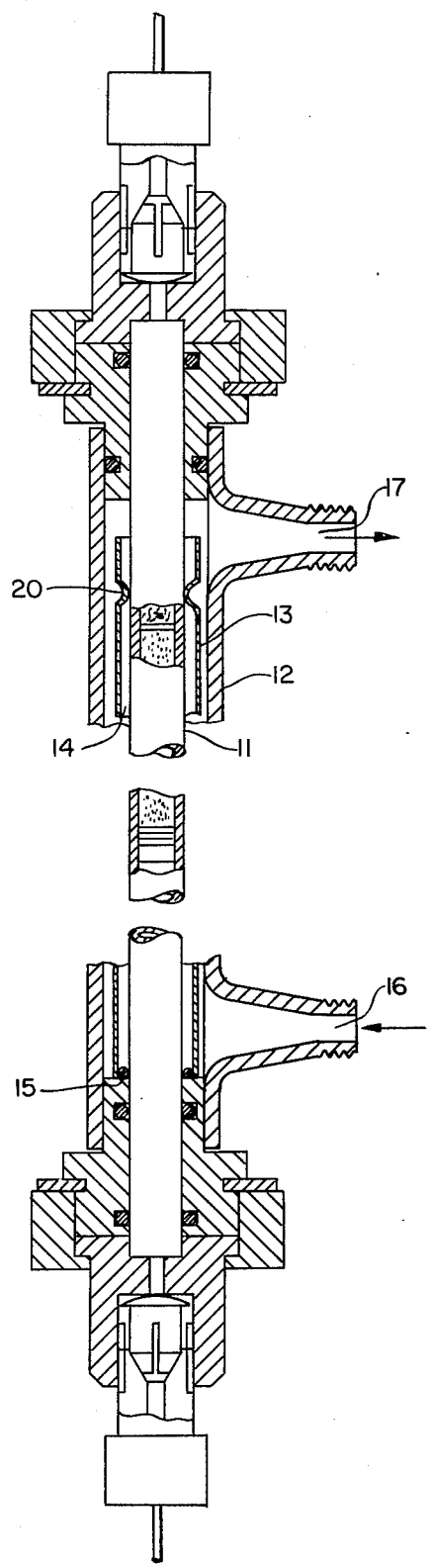
FIG. 1 is a sectional drawing illustrating a preferred embodiment of the invention.

Referring to FIG. 1, a chromatographic column 11, mounted in a jacket 12 for thermostatically controlled circulating water, is provided with a tube 13 which surrounds the column 11 but is spaced from it to form an annular space 14 which fills with water from the water jacket. To prevent circulation of water in the annular space 14, suitable sealing means such as an O-ring 15 is mounted between the column 11 and the tube 13, near the lower end of the tube 13. Tube 13 is composed of glass or other suitable material. Spacing dimples 20 are provided at the upper end of the tube 13. Suitable means, not referenced, are shown for introducing the chromatographic stream to column 11 and holding the column 11 and jacket 12 in an integral assembly.

Figure 2:
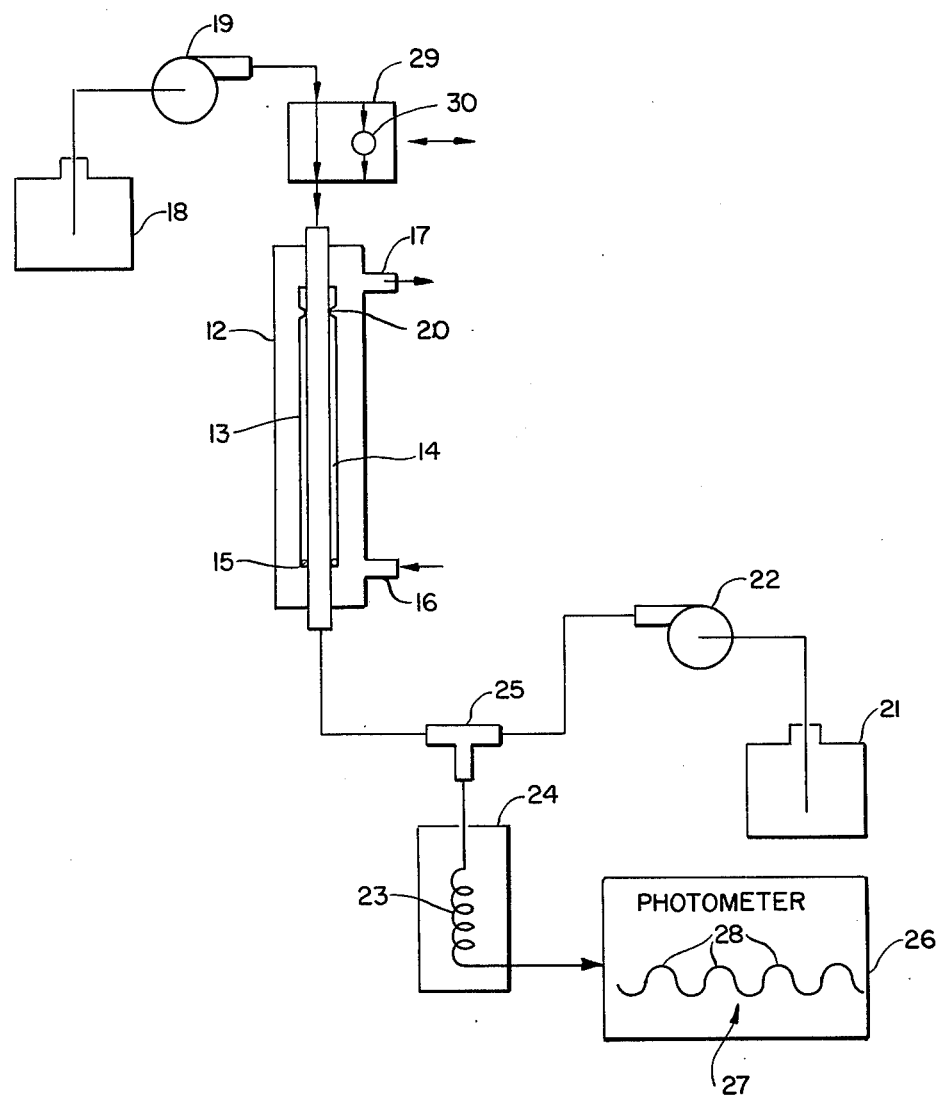
FIG. 2 is a schematic drawing of a chromatographic system in which the invention is used.

The water jacketed column 11 is utilized in conjunction with other elements of a conventional chromatographic analyzing system; some of these elements are indicated schematically in FIG. 2 to facilitate explanation of the principle of operation of the invention. The water jacket 12 has in-flow and out-flow ports 16 and 17 connected to suitable means, not shown, for circulating water or other high thermal capacity liquid medium, and thermostatic means for regulating and maintaining the long term temperature uniformity of the circulating liquid.

There is a reservoir 18 for buffer solution with a metering pump 19 connected between the reservoir 18 and means 29 for containing and injecting samples 30. There is also a reservoir 21 for a reagent such as ninhydrin with a metering pump 22 for delivering reagent from the reservoir 21. There is a color reaction coil 23 mounted in a heated bath 24 to develop the color of a mixture of column effluent and reagent delivered to the coil 23 through a mixing tee 25. A colorimeter 26 is connected to the outlet of the color reaction coil 23 and preferably a strip chart recorder is connected to the colorimeter 26 for producing a graph 27 in which a series of peaks 28 appear, having such shapes, locations and amplitudes as to enable the operator to identify the constituents of the sample flowing through the column 11 and the proportions of the constituents.

The arrangement shown is adapted for the analysis of constituents, particularly amino acids, with an increased sensitivity. The increased sensitivity is accomplished by utilizing much smaller samples than usual. For example, the sensitivity may be increased by a factor of 10 over existing instruments by reducing the internal volume of the active process by a factor of 10. Such reduction of such internal volume and sample size, however, aggravates a problem of temperature-related short term cyclic variations in the rate of flow of buffered solution from the column 11 and the proportions of buffered solution and reagent delivered to the mixing tee 25.

Notwithstanding the fact that the metering pump 19 delivers buffered solution at a constant rate to the column 11, short term cyclic variations in the volume of the column 11, causing short term cyclic variations in the rate of flow from the column 11, become apparent as "noise" or cyclic oscillations super-imposed on the waveform 27. These interfere with the recognition of the constituents represented by the peaks 28 and with the proper operation of automatic analysis and monitoring apparatus which are employed in conjunction with the colorimeter 26.

OPERATION

Without the presence of the spaced, column-surrounding tube 13, the thermostatically controlled circulating water jacket 12 would serve to avoid long term temperature fluctuations such as might be a result of gradual variations in ambient temperature but it could not prevent the effects of short term cyclic variations such as those with a time cycle of the order of a minute. In the specification and claims the phrases "short term fluctuation" or "short time cycle" are employed to refer to variations having a time cycle of approximately one minute or less and the phrase "long time cycle" is employed to refer to time cycles which are long in comparison. The tube 13 provides an annular space 14 in which a body of substance of high thermal capacity, which is not moving, surrounds the column 11. Consequently, the effective thermal capacity of the column 11 is increased. Moreover, short term cyclic temperature variations of the column 11 are effectively damped out. The O-ring 15 prevents circulation of water through the annular space 14 without interfering with the access of water from the circulating water jacket 12 to the space 14 between the spacing dimples 20.

Although the water in the annular space 14 effectively adds to the thermal capacity of the chromatographic column 11, sufficient heat transfer is permitted between the column 11 and the circulating water in the jacket 12 to effect closely controlled temperatures under long term load changes. It has been found that the tube 13 providing the annular, non-moving water column space 14 achieves reduction of short term temperature control fluctuations to the order of 0.06°C, approximately, with respect to time cycles of the order of 1 minute, whereas such close control would be difficult and comparatively expensive to accomplish with a circulating water system alone.

ALTERNATIVE EMBODIMENT

Figure 3:
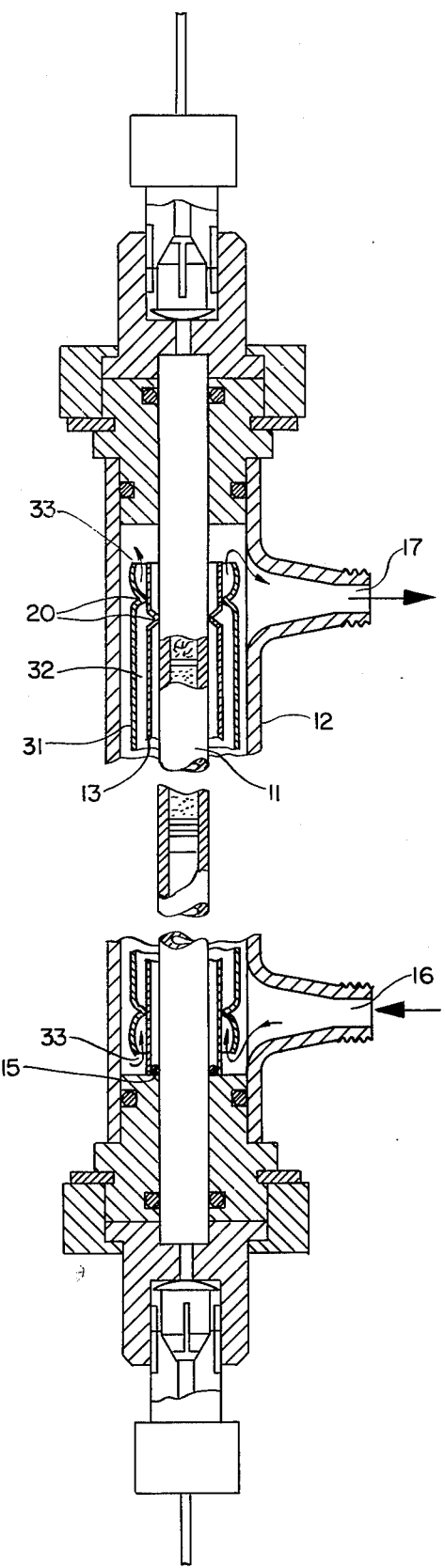
FIG. 3 is a sectional drawing illustrating an alternate form of the invention.

The particular form of the invention, as described in FIG. 1, consists of a column surrounded by single annulus of still water: For the representative application described, the preferred method of construction is to use glass for the chromatographic column, the tube surrounding the column, and the water jacket. It is quite conceivable that other materials, such as stainless steel or plastics may also be used to advantage in other chromatographic systems. Also, alternate forms of the basic invention could be employed in which multiple tubes of increasing diameter could be located about the column to provide multiple annuli of still media about the column. Further, an alternate form of the invention is that shown in FIG. 3, in which column 11 surrounded by tube 13, sealed at the bottom to column 11 is located within circulating water jacket 12 as described earlier. However, there is now added an additional tube 31 surrounding tube 13 providing an annulus 32 between tubes 13 and 31. Liquid is permitted to flow at a reduced rate up through annulus 32 by virtue of restricted top and bottom passageways 33 between tubes 13 and 31. The slow movement of fluid in annulus 32 would modulate temperature variations that appear in the main stream of jacketing fluid. Still liquid in annular space 14, by increasing the thermal capacity of the chromatographic column would serve to further damp out the reduced temperature variations of the liquid flowing through annulus 32.

While a particular form of the invention has been fully illustrated and described, it will be obvious to those skilled in the art that various modifications and alterations may be made therein, and it is intended to cover all such modifications and alterations as may fall within the spirit and scope of the invention.

What is claimed is:
1. In an analysis system having an analytical chromatography column, the improvement which comprises, in conjunction with means for avoiding fluctuations of column temperature which have long time cycles:
   spaced tubes which include an inner tube surrounding the column but spaced therefrom with a relatively high thermal capacity medium between the column and the inner tube,
   a water jacket constituting the means for avoiding temperature fluctuations which have long time cycles, and located around the column encompassed by the tube, whereby water from the water jacket is maintained between the column and the tubes to form the relative high thermal capacity medium, and
   means for limiting flow of water between the column and the inner tube to retain a relatively high thermal capacity medium between the column and the inner tube to supplement the thermal capacity of the column and minimize temperature-induced variations in volume of the column, and thus minimizing temperature-induced variation in rate of flow from the column.

2. The improvement defined in claim 1 wherein the tube means comprises an intermediate tube surrounding the inner tube with means for substantially preventing flow of water between the column and the inner tube and means for retarding flow of water between the inner and intermediate tubes.

3. In an analysis system having an analytical chromatography column through which sample flows and a water jacket surrounding this column in which thermostatically temperature-controlled liquid circulates, the improvement comprising:
   tube means surrounding the column and spaced therefrom; and
   flow restrictor means between the column and the tube means for limiting flow of liquid within the jacket immediately adjacent the column thereby providing a stagnant body of liquid adjacent the column for supplementing the thermal capacity of the column and thereby minimizing variations in column temperature of short term compared to temperature variations of liquid flowing directly through said water jacket and thus minimizing temperature-induced variations in volumn of the column and in rate of flow therefrom.

4. The improvement defined in claim 3 wherein a seal is provided between the column and the tube means at one end of the tube means and the flow restrictor is at the other end of the tube means.

5. The improvement defined in claim 3 wherein the tube is composed of glass.

6. In a chromatograph system having a vertical chromatograph column, a thermostatically controlled water jacket around the column, the water jacket containing a circulating liquid of substantially constant temperature capable of substantially avoiding temperature fluctuations having a long time cycle, the improvement comprising:
   a tube also within said water jacket and surrounding the column but spaced therefrom, said tube being open at the upper end,
   a seal at the lower end of said tube between said column and said tube whereby water circulating through said water jacket is maintained between said column and said tube to provide a body of substantially stationary liquid around said column which maintains substantial uniformity of temperature of the column and minimizes temperature induced variations in the column volume of the order of 1-minute cycles or less, whereby the flow rate of solutions eluting from said column are thereby maintained substantially constant.

7. The improvement defined in claim 6 wherein the seal constitutes an O-ring.

8. In a column type analytical system involving the flow of samples through a column and delivering effluent at a fixed rate of flow from the column, the method of minimizing short term temperature change induced fluctuations in rate of flow from the column which comprises separating the space surrounding the column to form inner and outer spaces with circulating liquid flowing in the outer space and liquid flow restricted in the inner space to cause retention of a stagnant body of liquid in the inner space around the column for damping out short-term fluctuations in temperature of the column while circulating liquid of controlled temperature in outer space surrounding the column and the stagnant body of liquid to avoid long term fluctuations in temperature of the column.

* * * * *